United States Patent
Abernathy et al.

(10) Patent No.: US 7,454,602 B2
(45) Date of Patent: Nov. 18, 2008

(54) PIPELINE HAVING BIFURCATED GLOBAL BRANCH HISTORY BUFFER FOR INDEXING BRANCH HISTORY TABLE PER INSTRUCTION FETCH GROUP

(75) Inventors: Chris M. Abernathy, Austin, TX (US); Jeffrey P. Bradford, Rochester, MN (US); Jason N. Dale, Austin, TX (US); Timothy H. Heil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/013,148

(22) Filed: Dec. 15, 2004

(65) Prior Publication Data

US 2006/0149951 A1    Jul. 6, 2006

(51) Int. Cl.
G06F 7/38 (2006.01)
G06F 9/00 (2006.01)
G06F 9/44 (2006.01)
G06F 15/00 (2006.01)

(52) U.S. Cl. ...................... 712/240; 712/239
(58) Field of Classification Search ................. 712/239, 712/240
See application file for complete search history.

(56) References Cited

U.S. PATENT DOCUMENTS 5,687,110 A * 11/1997 Tran et al. .................... 365/154
6,272,624 B1 * 8/2001 Giacalone et al. ........... 712/239
6,374,349 B1 * 4/2002 McFarling ................... 712/239
6,704,860 B1 * 3/2004 Moore ......................... 712/237
7,000,096 B1 * 2/2006 Sinharoy ..................... 712/240

OTHER PUBLICATIONS

Yeh & Patt; A Comprehensive Instruction Fetch Mechanism for a Processor Supporting Speculative Execution; 1992; IEEE Computer Society Press; International Symposium on Microarchitecture; pp. 129-139.*
Skadron, Martonosi & Clark; Speculative Updates of Local and Global Branch History: A Quantitative Analysis; Dec. 1998; Princeton Department of Computer Science; Technical Report TR-589-98; pp. 1-23.*

* cited by examiner

Primary Examiner—Eddie P Chan
Assistant Examiner—Corey S Faherty
(74) Attorney, Agent, or Firm—Dillon & Yudell LLP

(57) ABSTRACT

A method and apparatus for updating global branch history information are disclosed. A dynamic branch predictor within a data processing system includes a global branch history (GBH) buffer and a branch history table. The GBH buffer contains GBH information of a group of the most recent branch instructions. The branch history table includes multiple entries, each entry is associated with one or more branch instructions. The GBH information from the GBH buffer can be used to index into the branch history table to obtain a branch prediction signal. In response to a fetch group of instructions, a fixed number of GBH bits is shifted into the GBH buffer. The number of GBH bits is the same regardless of the number of branch instructions within the fetch group of instructions. In addition, there is a unique bit pattern associated with the case of no taken branch in the fetch group, regardless of the number of not-taken branches of even if there are any branches in the fetch group.

5 Claims, 3 Drawing Sheets

PIPELINE HAVING BIFURCATED GLOBAL BRANCH HISTORY BUFFER FOR INDEXING BRANCH HISTORY TABLE PER INSTRUCTION FETCH GROUP

BACKGROUND OF THE INVENTION

1. Technical Field

The present invention relates to branch predictions in general, and, in particular, to a method and apparatus for performing branch predictions. Still more particularly, the present invention relates to a method and apparatus for updating global branch history information.

2. Description of Related Art

Within a data processing system, instructions are typically stored in consecutive memory locations within a system memory. During operation, instructions are fetched from consecutive memory locations by a processor. Each time an instruction is fetched from the system memory, a program counter within the processor is incremented so that the program counter contains the memory address of a subsequent instruction. The instructions fetching, program counter incrementing, and instructions execution continues linearly through the system memory until a program control instruction is encountered. A program control instruction, when executed, changes the memory address in the program counter and causes the flow of the program execution to be altered. Examples of program control instructions include Branch, Jump conditionally, Call, and Return.

For a processor that includes a pipeline architecture, it is often not clear whether or not a branch instruction will alter the program flow until the branch instruction reaches a late stage in the pipeline. But the processor may have already fetched other instructions and is executing them in early stages of the pipeline. If the branch instruction causes a change in the program flow, all of the instructions within the pipeline that followed the branch instruction must be thrown out, which typically results in processing delays.

To alleviate such processing delays, many pipelined processors use branch prediction mechanisms to predict the outcome of branch instructions, and then fetch subsequent instructions according to the branch prediction. Branch prediction mechanisms can be either static or dynamic.

With a static branch prediction mechanism, the prediction remains the same for a given branch instruction throughout the entire execution of the program in which the branch instruction is contained. In contrast, a dynamic branch prediction mechanism keeps a history of the outcome of branch instructions as a program executes and makes branch predictions based upon such history.

The simplest dynamic branch prediction mechanism is an array of one-bit storage elements, commonly referred to as a branch history table (BHT). A portion of the address of a branch instruction is typically used to index into the BHT. Each entry within the BHT may contain a two-bit counter. Since a two-bit counter can provide a decimal range of 0 to 3, high values (such as 2 or 3) can be used to represent taken branches, and low values (such as 0 or 1) can be used to represent not-taken branches. If the value in the two-bit counter is a 2 or 3, a branch is predicted to be taken. On the other hand, if the value in the two-bit counter is a 0 or 1, a branch is predicted to be not-taken. The actual outcome of a branch instruction is known once a branch instruction has been executed. If the branch was taken, the two-bit counter is incremented, saturating at 3. If the branch was not-taken, the two-bit counter is decremented, saturating at 0. Each time a branch instruction is executed, the BHT is updated based on the outcome of the execution. The history in a BHT is commonly referred to as a local branch history since it records branch history on an individual branch instruction basis.

It has been observed that the behavior of a given branch instruction in a program is often correlated with the behavior of other branch instructions in the program. Therefore, when making a branch prediction about a particular branch instruction, some branch predictors use the history of that particular branch instruction along with the behavior of other branch instructions. The history of all branch instructions is commonly referred to as a global branch history (GBH).

Generally speaking, conventional methods of updating GBH information suffer from two problems. The first problem is attributed to the delays in updating GBH information to reflect new branch instructions. If the GBH can be read, the branch prediction(s) can be made, and the GBH can be updated all in one cycle, then the above-mentioned problem would not exist. However, current processors typically have a multi-cycle branch prediction mechanism, as required by high clock frequencies. Thus, it is typically not possible to perform a single cycle branch prediction, and a method is needed to quickly update the GBH information for the next prediction before the previous prediction is completed.

The second problem with conventional methods of updating GBH information is the requirement for branch instructions to keep track of GBH information. Basically, a branch instruction must record GBH bits that are used to index into a branch prediction table. Many forms of branch prediction require updating some state using the GBH after the branch has been resolved, even in the absence of a flush. The same value of the GBH as read when making the branch prediction typically needs to be used when updating the state. If it is possible for the GBH bits to be out-of-date when read, unless it is possible to recreate exactly how the GBH bits are out of date, then the only way to know what the value of the GBH bits read in the beginning of the pipeline is for the branch instruction to record such information. Recording such information requires additional overhead.

Consequently, it would be desirable to provide an improved method and apparatus for updating GBH information.

SUMMARY OF THE INVENTION

In accordance with a preferred embodiment of the present invention, a dynamic branch predictor within a data processing system includes a global branch history (GBH) buffer and a branch history table. The GBH buffer contains GBH information of a number of the most recent branch instructions. The branch history table includes multiple entries, each entry is associated with one or more branch instructions. The GBH information from the GBH buffer can be used to index into the branch history table to obtain a branch prediction signal.

In response to a fetch group of instructions, a fixed number of GBH bits is shifted into the GBH buffer. The number of GBH bits is the same regardless of the number of branch instructions within the fetch group of instructions. In addition, there is a unique bit pattern associated with the case of no taken branch in the fetch group, regardless of the number of not-taken branches or even if there are any branches in the fetch group.

With the present invention, in the common case of a processor continuing to fetch along the not-taken path, the GBH information is always kept up to date even when there is a multi-cycle delay between reading and updating the GBH in response to the branches in an instruction fetch group. Further, the present invention can be used to eliminate the requirement that the read GBH for making the prediction is kept in the branch instruction within the pipeline in order to update the branch prediction state after the branch has been resolved.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
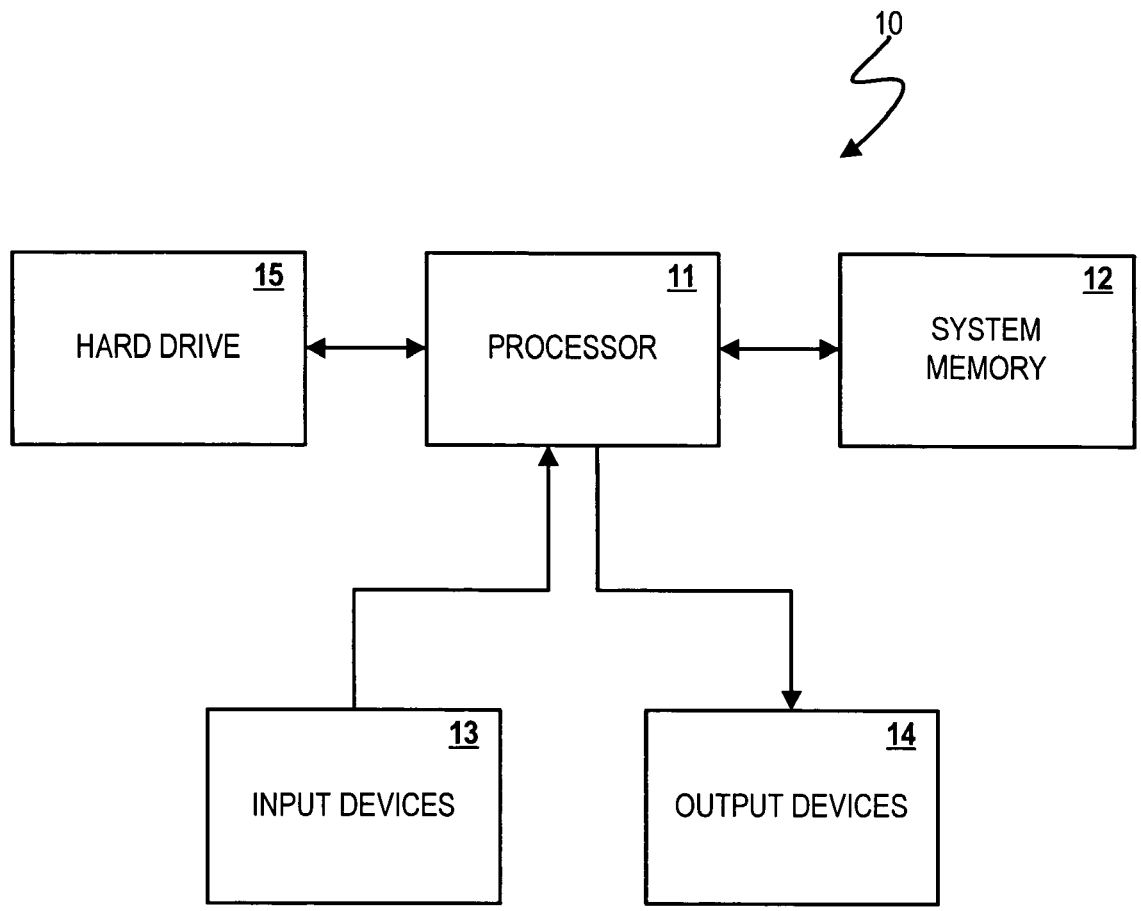
FIG. 1 is a block diagram of a data processing system in which a preferred embodiment of the present invention is incorporated.

Referring now to the drawings and in particular to FIG. 1, there is depicted a block diagram of a data processing system in which a preferred embodiment of the present invention is incorporated. As shown, a computer system 10 includes a processor 11, a system memory 12 and a hard drive 15. Processor 11 executes instructions and data that are stored in system memory 12. In addition, computer system 10 also includes input devices 13, such as a keyboard, a mouse, etc., and output devices 14, such as a display monitor, a printer, etc.

Figure 2:
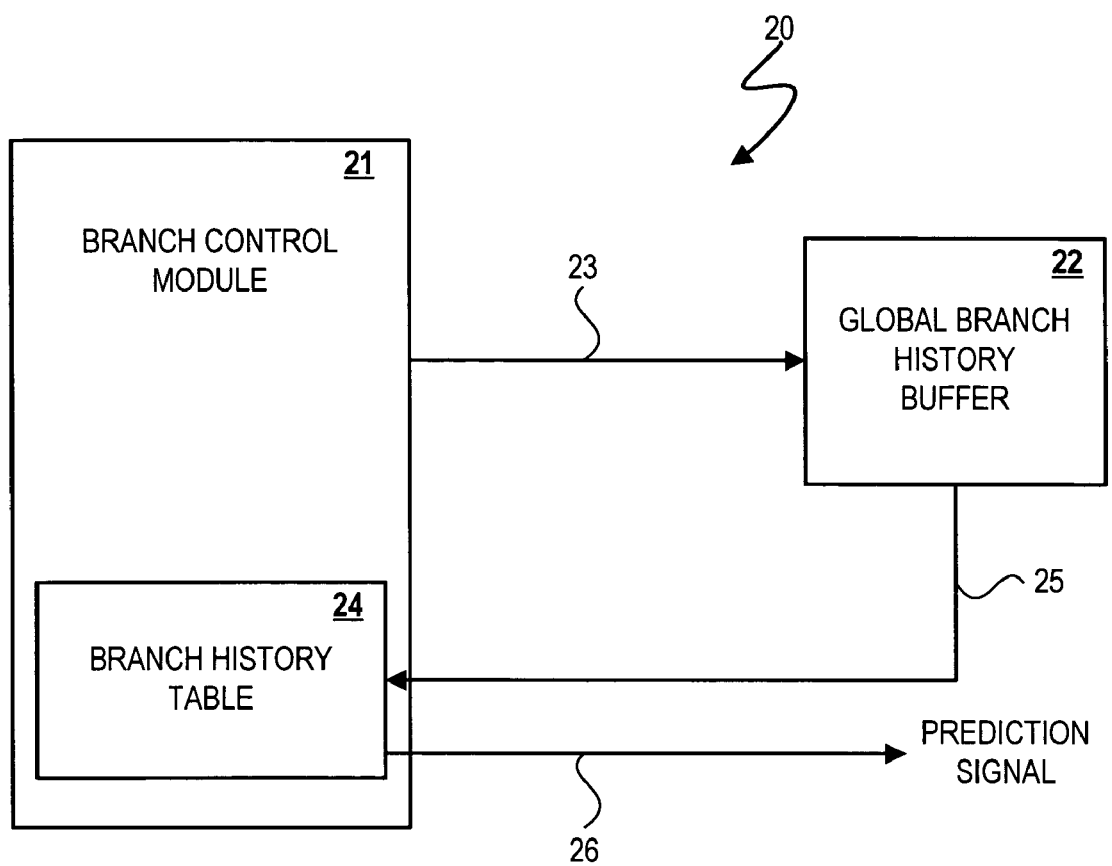
FIG. 2 is a block diagram of a dynamic branch predictor within the data processing system from FIG. 1, in accordance with a preferred embodiment of the present invention.

With reference now to FIG. 2, there is illustrated a block diagram of a dynamic branch predictor within data processing system 10, in accordance with a preferred embodiment of the present invention. As shown, a dynamic branch predictor 20 includes a branch control module 21 and a global branch history buffer 22. Global branch history buffer 22 contains global branch history (GBH) information of the most recent p branch instructions in the form of n GBH bits, where p is typically (but is not required) to equal n. Specifically, global branch history buffer 22 is an n-bit wide shift register. Global branch history buffer 22 receives an output signal 23 from branch control module 21. The value of output signal 23 is shifted into global branch history buffer 22, and oldest bits in global branch history buffer 22 are discarded.

Branch control module 21 also includes a branch history table 24. Branch history table 24 stores branch prediction information based on a history of previous branch instruction outcomes. Branch history table 24 includes multiple entries, each entry ideally representing a branch prediction for a branch instruction.

Dynamic branch predictor 20 predicts the outcome of a branch instruction based on the instruction address of a branch instruction, based on the current state of the GBH bits, and based on the current state of branch history table 24. Specifically, a predetermined number of low-order bits of the address of the branch instruction to predict are XORed with all the GBH bits within global branch history buffer 22 to produce an index 25 into branch history table 24. In turn, branch history table 24 generates a prediction signal 26.

Figure 3:
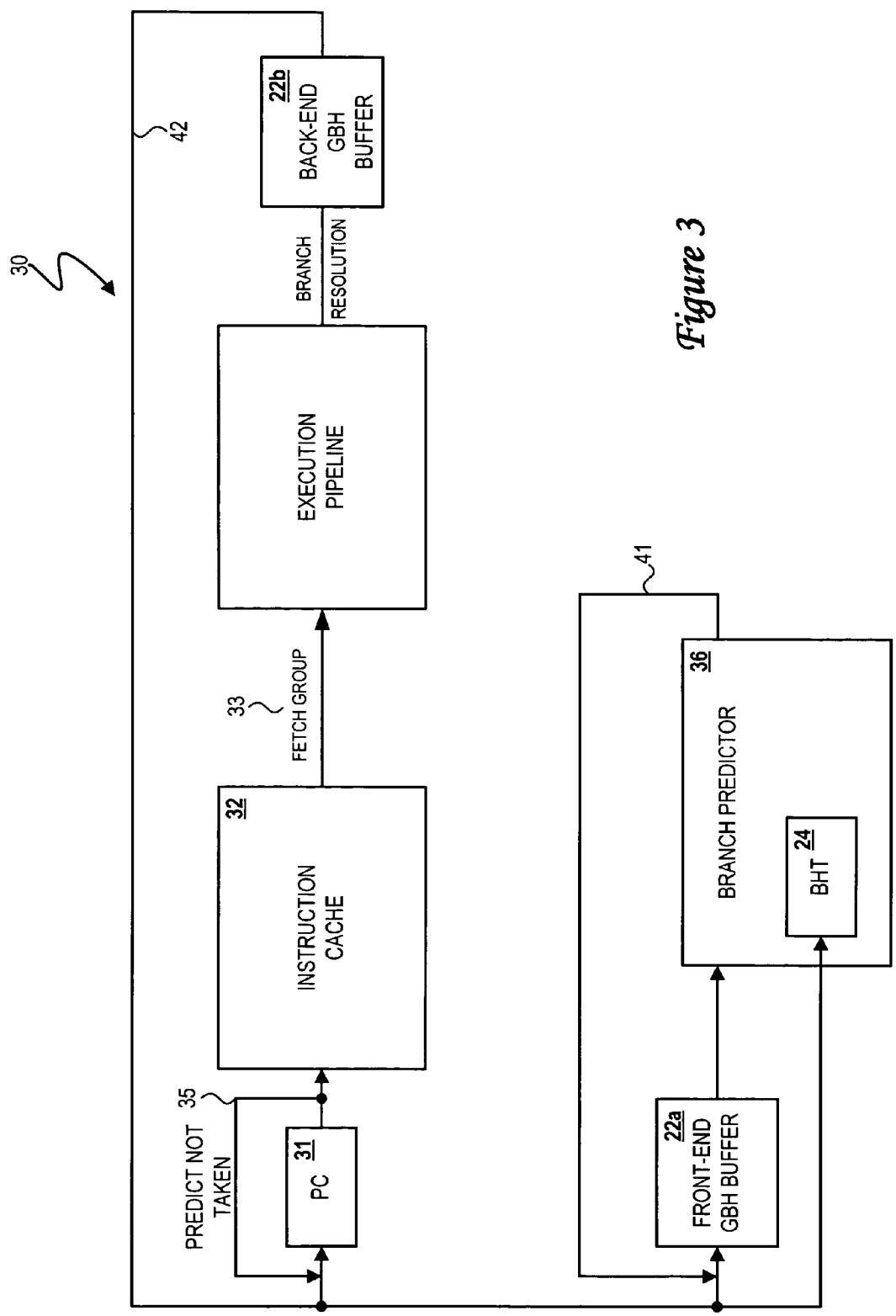
FIG. 3 is a functional flow diagram of the dynamic branch predictor from FIG. 2, in accordance with a preferred embodiment of the present invention.

Referring now to FIG. 3, there is depicted a functional flow diagram of dynamic branch predictor 20, in accordance with a preferred embodiment of the present invention. At the beginning of a pipeline 30, a program counter 31 is used to access an instruction cache 32. Instruction cache 32 provides one or more instructions starting at the requested address. Such group of instructions is referred to as a fetch group 33. Either at the same time, or possibly sometime later, program counter 31 and current GBH information are used to begin the branch prediction process for fetch group 33. The branch prediction takes multiple clock cycles; so in order to provide a new fetch group every cycle, program counter 31 is updated with a simple yet fast predict-not-taken algorithm. For common straight-line code, the fetch mechanism can deliver one fetch group per cycle. Taken branches incur a multi-cycle penalty.

As shown in FIG. 3, global branch history buffer 22 in FIG. 2 is bifurcated and made up of a front-end GBH buffer 22a and a back-end GBH buffer 22b. When dynamic branch predictor 20 discovers a taken branch several cycles later, then the erroneously fetched groups along a not-taken path 35 will be "squashed." At this point, front-end GBH buffer 22a can be corrected prior to the fetch of the new path. Front-end GBH buffer 22a used to predict those squashed fetch groups was wrong, but this is irrelevant because those fetch groups are squashed. Similar reasoning can be applied to branch mispredictions discovered after a branch is resolved near the end of pipeline 30.

Since a new fetch group must be predicted every cycle, the GBH information for the next fetch group along not-taken path 35 must be computed in one cycle. Since the branch prediction takes multiple cycles, the ideal GBH information from the prior fetch group(s) being predicted are not available. The present invention deals with computing GBH information for the next fetch group along not-taken path 35.

First, the GBH bits need not be the exact branch history. Rather than shifting in one bit per branch instruction into the GBH register, in accordance with a preferred embodiment of the present invention, for each fetch group of instructions (from instruction cache 32 or a system memory), a fixed number of GBH bits are fed into front-end GBH buffer 22a for the purpose of updating front-end GBH buffer 22. The number of GBH bits, which does not necessarily equal the number of instructions within a fetch group, can be any number of bits as long as it is the same throughout. Those bits are shifted in only on valid instruction fetches. If instruction cache 32 is not being accessed, for example, if instruction buffers are full, then no bit is shifted in.

Second, a fetch group that contains or is predicted to contain no taken branches is represented by a unique bit pattern regardless of the number of branch instructions within the fetch group. Since a processor continues to fetch along not-taken path 35, the processor is implicitly assuming that there are no taken branches. Hence, the unique pattern can be immediately shifted into global branch history buffer 22 for the current fetch group, in preparation for the next fetch group along not-taken path 35. If a branch predictor 36 discovers that the fetch group does indeed contain a taken branch, then the wrong pattern was shifted in. However, global branch history buffer 22 can be updated to the true history during the branch redirect time, as described above.

The present invention can be illustrated by way of an example. If the number of GBH bits is desired to be two bits, then an exemplary assignment for the two GBH bits can be as follows:

00 no branch taken
    01 first conditional branch is taken 10 second conditional branch is taken 11 third or later conditional branch is taken Note that fetch groups are typically eight instructions or fewer. Because of this, it is very rare for a single fetch group to have more than three conditional branches. Unconditional branches can either be represented just like a conditional branch, or no bits can be shifted in for a fetch group that ends with an unconditional branch.

With the above-mentioned assignment of GBH bits, a bit pattern "00" can be immediately shifted into global branch history buffer 22 for each fetch group with no branch taken, and hence the GBH bits read for a next fetch group are always up-to-date.

The discussion above is aimed at processors in which the processor continues to fetch along the not-taken path. However, as long as there is a unique bit pattern for no taken branches, the present invention is not limited to such processors. For example, for processors that use a Branch Target Address Cache (BTAC) or a Branch Target Buffer (BTB) to immediately and speculatively redirect instruction fetch, the BTAC can contain not only the target PC but also the bits to shift into the GBH buffer on a redirect.

The above-mentioned scheme solves the problem of keeping GBH bits used up-to-date when making a branch prediction. In many branch prediction schemes, however, the BHT is required to be updated when a branch is resolved, even if the branch prediction is correct. In those cases, the global branch history information is needed at the end of a pipeline as well as at the beginning of the pipeline. If the GBH is not known precisely when a fetch group is predicted, then the GBH information used for the prediction must be kept with every instruction or every branch as it flows through the pipeline. Because the present invention keeps the GBH up-to-date at the front-end of the pipeline, such is not necessary. Instead, a second GBH register can be maintained at the back-end of the pipeline.

Two versions of GBH bits are kept in two separate locations: a front-end version of the GBH bits are kept in an early stage of a pipeline such as within GBH buffer 22a before branch instructions have been resolved to read global branch history buffer 22, and a back-end version of the GBH bits are kept in a late stage of the pipeline such as within GBH buffer 22b after branch instructions have been resolved to update global branch history buffer 22 in preparation for the next read. In order to guarantee the GBH bits as recorded at the early stage of the pipeline (when the branch prediction is made) to be the same as the GBH bits as recorded at the late stage of the pipeline (when the branch predictor is updated), the following procedure may be used.

The processor is assumed to fetch along the not-taken branch path until a branch instruction is found, and instruction addresses are assumed to be available at the end of a pipeline. In addition, an extra bit is required for each instruction to indicate whether or not the instruction is the first instruction in a fetch group along an execution path. Also, in conjunction with the back-end GBH bits within back-end GBH buffer 22b, a saturating 2-bit fetch-group pattern counter and a 1-bit "taken-branch found" flag are needed. The fetch group pattern counter is initialized to "00." The taken-branch found flag is initialized to false. Both the front-end and back-end GBHs within GBH buffers 22a and 22b are initialized to all 0's.

At some point in the pipeline, after a branch instruction has been resolved, the back-end GBH bits are updated using the following rules: Instructions must be seen to be in correct execution order at this point, or the program order must be able to be reconstructed. Instructions are processed by the present algorithm in-order, but, in general, multiple instructions may be presented in a single cycle.

1. If the first instruction in a fetch group flag is true, then shift the bits in the fetch-group pattern counter into global history buffer 22 if the "taken-branch found" flag is true;

shift "00" into global history buffer 22 if the "taken-branch found" flag is false, Next, set the fetch-group pattern counter to "00", and clear the "taken-branch found" flag.

2. If an instruction is a taken branch, then the "taken-branch found" flag is set to true.

3. If an instruction is a branch instruction, then the fetch-group pattern counter is incremented, saturating at "11."

At the end of the above-mentioned algorithm, the GBH value in back-end GBH buffer 22b will equal the GBH value in front-end GBH buffer 22a used to predict the fetch group containing the instruction. The GBH value can be used to update BHT 24. Only step 1 updates the back-end GBH, so the back-end GBH can be used after step 1.

In addition to updating BHT 24 after the branch instruction has been resolved, the above-mentioned algorithm may also ease the restoration of the GBH information whenever instructions are flushed and re-fetched, such as after a branch misprediction or other flush. As instructions are fetched, they typically update the GBH; if these instructions are later flushed, any change the flushed instructions made to the GBH must be "undone" and the GBH buffer state restored to what it would have been had none of the flushed instructions updated it. By keeping an always up-to-date copy of the GBH buffer in the back-end, restoration of the GBH buffer on a flush becomes a simple process.

As shown in FIG. 3, there are two distinct flush paths: a fast path 41 immediately after the branch prediction is made for a predicted taken condition branch or an unconditional branch, and a slow path 42 for a branch mispredict or other flush source. The restoration of the GBH after "slow path" flush can be done merely by copying the contents of back-end GBH buffer 22b into front-end GBH buffer 22a. The restoration of the GBH after a "fast path" flush can be similarly be done by keeping a third copy of the GBH in the middle of the pipeline for just this purpose. Alternatively, because there is a known limit on the number of incorrect bits that could have been shifted into front-end GBH buffer 22a when a "fast path" flush is detected, front-end GBH buffer 22a can be extended by this many bits, the number of recent updates recorded, and on a "fast path" flush front-end GBH buffer 22a can just be shifted down by the number of incorrect bits that have been shifted in.

When a fetch group contains a taken branch, it is possible to shift in a variable number of bits, for instance, based on the number of branch instructions in the fetch group. Only when a fetch group does not contain any taken branch must the pattern be fixed length and a unique pattern irrespective to the number of branch instructions in the fetch group is shifted in.

As has been described, the present invention provides a method and apparatus for updating GBH information. The present invention allows GBH bits to be implemented in such a way that the GBH bits are always up-to-date when a global branch history buffer is read. With the present invention, the GBH bits do not need to be kept up with branch instructions within a pipeline.

For ease of explanation, the description presented above uses specific values for the size of a global branch history buffer, the number of entries, etc.; however, it is understood by those skilled in the art that other implementations are possible.

Although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or hard drives, and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for updating global branch history (GBH) information in a pipelined instruction processing system, said method comprising:
providing a branch history table having a plurality of entries, wherein each entry associates a branch instruction with a branch prediction value;
providing a bifurcated GBH buffer that contains GBH information that is used to index into said branch history table to obtain a branch prediction signal, said bifurcated GBH buffer comprising:
a front-end GBH buffer containing GBH bits for indexing into said branch history table, said front-end GBH buffer coupled to an input side of an instruction processing pipeline; and
a back-end GBH buffer containing GBH bits for indexing into said branch history table, said back-end GBH buffer coupled to an output side of the instruction processing pipeline;
providing a fetch group pattern counter that counts the number of taken branch instructions within a single fetch group;
providing a taken-branch flag that indicates whether a branch has been taken in a single fetch group;
responsive to a next fetch group of instructions being fetched from an instruction cache, initializing said front-end GBH buffer by shifting a fixed number of GBH bits into said front-end GBH buffer, wherein said fixed number is independent of the number of branch instructions within said next fetch group;
in further response to fetching said next fetch group, updating said back-end GBH buffer by performing the following steps:
responsive to determining that an instruction is a first instruction of said next fetch group:
determining whether or not said taken-branch flag is set to true;
responsive to determining that said taken-branch flag is set to true, shifting the bits in said fetch group pattern counter into said back-end GBH buffer;
responsive to determining that said taken-branch flag is set to false, shifting a not-taken pattern into said back-end GBH buffer; and
responsive to either one of said shifting said bits in said fetch group pattern counter into said back-end GBH buffer step or said shifting said not-taken pattern into said back-end GBH buffer step, setting said fetch group pattern counter to zero and setting said taken-branch flag to false;
if a fetched instruction is a taken branch, setting the taken-branch flag to true; and
if said fetched instruction is a branch instruction, incrementing said fetch group pattern counter; and
using the updated GBH bits in back-end GBH buffer to update the front-end GBH buffer.

2. The method of claim 1, wherein said pipelined instruction processing system fetches along a not-taken path each cycle until branch predictions from a previous fetch group is known.

3. The method of claim 1, wherein said pipelined instruction processing system uses a fast single-cycle predictor to follow taken paths until said branch predictions from an earlier fetch groups are known; and, in the case where said fast single-cycle predictor indicates a taken path should be followed, said fast single-cycle predictor also indicates the pattern to be shifted into said bifurcated GBH.

4. An instruction processing apparatus that maintains updated global branch history (GBH) information, said instruction processing apparatus comprising:
a branch history table having a plurality of entries, wherein each entry associates a branch instruction with a branch prediction value;
a bifurcated GBH buffer that contains GBH information that is used to index into said branch history table to obtain a branch prediction signal, said bifurcated GBH buffer comprising:
a front-end GBH buffer containing GBH bits for indexing into said branch history table, said front-end GBH buffer coupled to an input side of an instruction processing pipeline; and
a back-end GBH buffer containing GBH bits for indexing into said branch history table, said back-end GBH buffer coupled to an output side of the instruction processing pipeline;
a fetch group pattern counter that counts the number of taken branch instructions within a single fetch group;
a taken-branch flag that indicates whether a branch has been taken in a single fetch group;
means responsive to a next fetch group of instructions being fetched from an instruction cache, for initializing said front-end GBH buffer by shifting a fixed number of bits into said front-end GBH buffer, wherein said fixed number is independent of the number of branch instructions within said next fetch group;
means for updating said back-end GBH buffer responsive to fetching said next fetch group of instructions, said means for updating said back-end GBH buffer performing the following steps:
responsive to determining that an instruction is a first instruction of said next fetch group:
determining whether or not said taken-branch flag is set to true;
responsive to determining that said taken-branch flag is set to true, shifting the bits in said fetch group pattern counter into said back-end GBH buffer;
responsive to determining that said taken-branch flag is set to false, shifting a not-taken pattern into said back-end GBH buffer; and
responsive to either one of said shifting said bits in said fetch group pattern counter into said back-end GBH buffer step or said shifting said not-taken pattern into said back-end GBH buffer step, setting said fetch group pattern counter to zero and setting said taken-branch flag to false; and if a fetched instruction is a taken branch, setting the taken-branch flag to true; and if said fetched instruction is a branch instruction, incrementing said fetch group pattern counter; and using the updated back-end GBH buffer to update the front-end GBH buffer.

5. The instruction processing apparatus of claim 4, wherein said front-end GBH buffer and said back-end GBH buffer each comprise an n-bit wide shift register containing GBH information of p most recent branch instructions.

* * * * *